United States Patent [19]
Hutchinson et al.

[11] Patent Number: 5,149,393
[45] Date of Patent: Sep. 22, 1992

[54] EDGE SEALER FOR MULTI-PLY BUSINESS FORMS

[75] Inventors: Wilbur P. Hutchinson, Mt. Prospect, Ill.; Gerald L. Smith, Dover, N.H.

[73] Assignee: Moore Business Forms, Inc., Grand Island, N.Y.

[21] Appl. No.: 426,650

[22] Filed: Oct. 26, 1989

[51] Int. Cl.$^5$ .......................... B30B 5/06; B30B 15/34
[52] U.S. Cl. ................................ 156/555; 156/583.1; 156/583.5; 100/93 RP; 425/374
[58] Field of Search ................... 156/583.5, 555, 499, 156/202, 291, 475, 477.1, 479, 580, 583.1; 100/93 RP; 425/374, 363

[56] References Cited

U.S. PATENT DOCUMENTS

| | | |
|---|---|---|
| 1,144,506 | 6/1915 | Staude ........................... 493/241 |
| 1,969,660 | 8/1934 | McLaurin . |
| 2,324,834 | 7/1943 | Gurwick . |
| 2,348,864 | 5/1944 | Staude ........................... 91/18 |
| 2,368,392 | 11/1945 | Davies . |
| 2,584,633 | 2/1952 | Southwick, Jr. . |
| 2,898,973 | 8/1959 | Marsh . |
| 2,940,404 | 6/1960 | Damon . |
| 3,193,978 | 7/1965 | Bader . |
| 3,243,330 | 3/1966 | Zelnick ........................... 156/380 |
| 3,527,632 | 9/1970 | Holes et al. .................... 156/479 X |
| 3,596,899 | 8/1971 | Fulk . |
| 3,625,803 | 12/1971 | Masulis et al. . |
| 3,682,740 | 8/1972 | Newton . |
| 3,759,508 | 9/1973 | Jeppsson . |
| 3,892,620 | 7/1975 | Heussy . |
| 3,957,564 | 5/1976 | Lambert et al. . |
| 4,033,807 | 7/1977 | Neill et al. . |
| 4,050,361 | 9/1977 | Traise . |
| 4,154,180 | 5/1979 | Burton . |
| 4,259,143 | 3/1981 | Giulie et al. . |
| 4,344,610 | 8/1982 | Jeschke et al. . |
| 4,353,776 | 10/1982 | Giulie et al. ............... 100/93 RP X |
| 4,420,147 | 12/1983 | Knox et al. . |
| 4,473,425 | 9/1984 | Baughman et al. . |
| 4,494,648 | 1/1985 | Held ........................... 156/583.5 X |
| 4,526,642 | 7/1985 | Caughey . |
| 4,540,458 | 9/1985 | Baughman et al. . |
| 4,560,431 | 12/1985 | Inselmann .................... 156/583.5 X |
| 4,589,590 | 5/1986 | McGuire et al. . |
| 4,680,073 | 7/1987 | Brunner et al. .............. 156/583.5 X |
| 4,856,260 | 8/1989 | Woo et al. .................... 156/583.1 X |

FOREIGN PATENT DOCUMENTS

| | | |
|---|---|---|
| 140464 | 4/1903 | Fed. Rep. of Germany . |
| 2418717 | 9/1979 | France . |
| WO/8702943 | 5/1987 | PCT Int'l Appl. . |

Primary Examiner—David A. Simmons
Assistant Examiner—J. Sells
Attorney, Agent, or Firm—Nixon & Vanderhye

[57] ABSTRACT

An edge sealer includes a heater anvil having a heater band disposed in a convex configuration and lying opposite a drive belt. Multi-ply business forms are conveyed along the edge sealer, with the edge of the form extending between the belt and the heater band. Application of heat by the heater band to the edge activates the heat-sensitive adhesive to adhesively seal the edges of the plies one to the other without applying heat to the body of the form. A conveyor system transfers forms from one conveyor to another without change of spatial orientation of the forms to pass the unsealed edges of the forms through an additional edge sealing unit downstream of the first edge sealing unit.

12 Claims, 2 Drawing Sheets

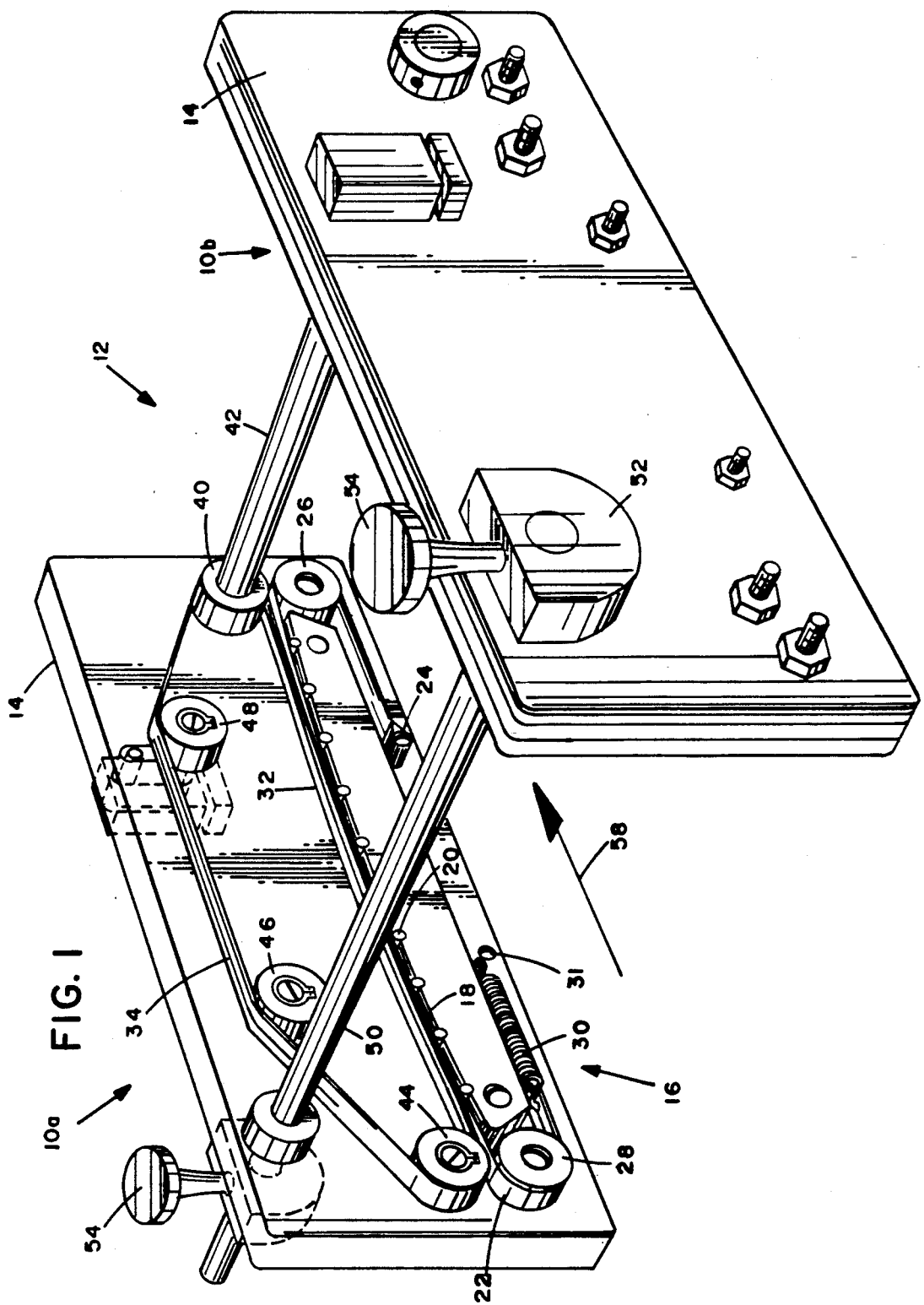

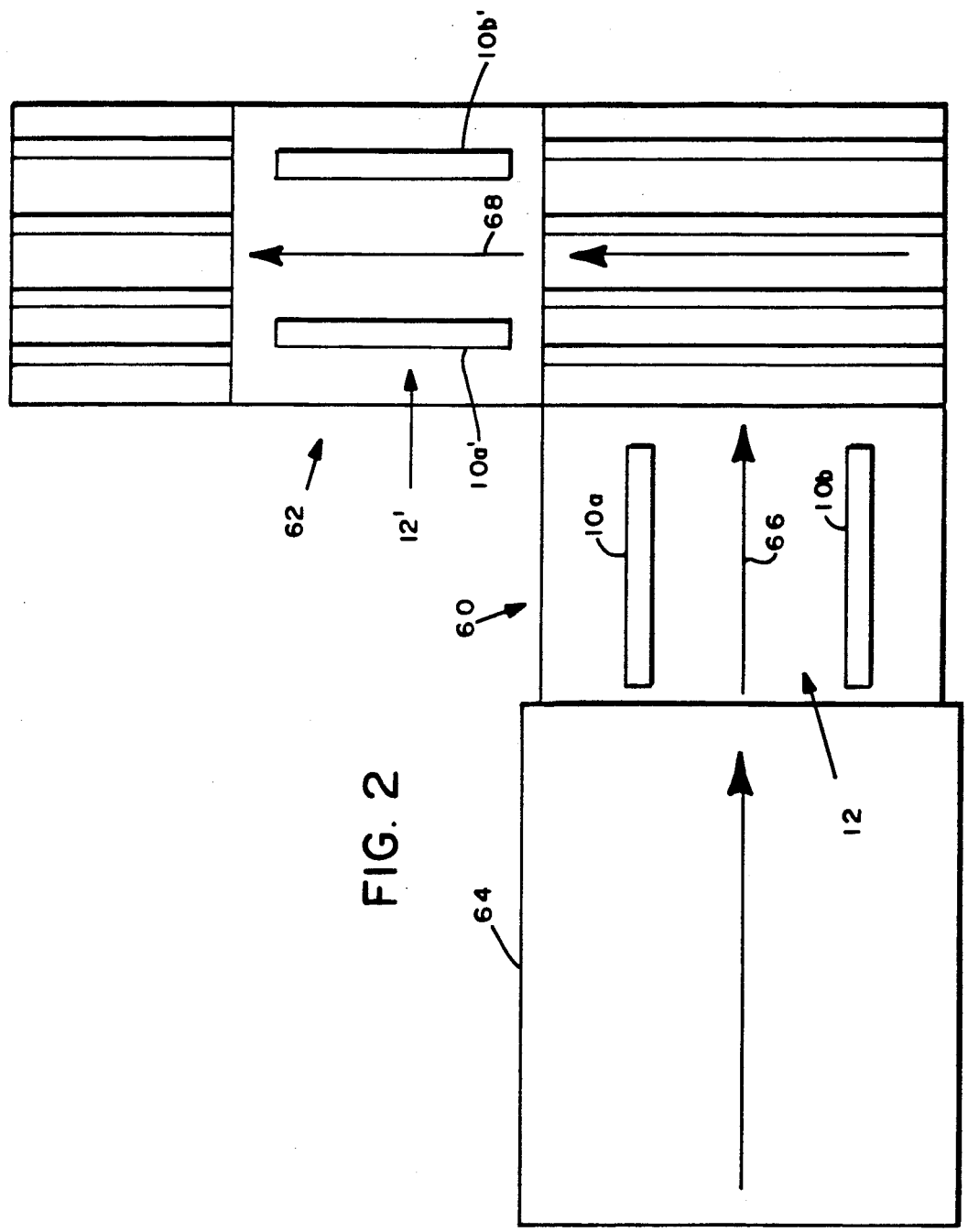

EDGE SEALER FOR MULTI-PLY BUSINESS FORMS

BACKGROUND AND SUMMARY OF THE INVENTION

The present invention relates to an edge sealer for adhesively sealing the edges of multi-ply business forms and particularly relates to an edge sealer for a multi-ply business form which applies heat along an edge of the form to activate heat-sensitive adhesive applied thereto for securing the edges of the plies one to the other.

In the manufacture of multi-ply business forms, it is common to apply adhesive along the edges of the form whereby, upon activation of the adhesive, the edges of the plies are sealed one to the other, leaving the interior of the plies separated each from the other. Typically, heat-sealing apparatus is used to apply heat to the full width of the form, notwithstanding that only the edges of the form require the application of heat to activate the adhesive. With the current increasing use of cold fuse-type laser printers for many printing applications, it has been found that the heat generated by such heat-sealing apparatus softens the toner used by those printers and transfers information from one ply to another, i.e., from a ply to the opposite side of a folded form. Consequently, it has been found desirable to provide an edge sealer which would avoid the application of heat to the body of the form and activate the adhesive by applying heat only to the edge of the form.

According to the present invention, there is provided an edge sealer for applying heat only in the edge areas of the form containing the adhesive. Particularly, the edge sealer hereof includes a frame which carries an anvil having a guide surface, preferably convex in shape, in opposition to a portion of an endless belt, also carried by the frame. The belt is driven in the direction of the flow of the forms by a driveshaft and pulley arrangement. The portion of the belt in opposition to the anvil is concave because of its engagement with and conformance to the convex surface of the anvil. The conforming convex heater block surface and belt portion define a conveyor track or run therebetween for receiving the edges of multi-ply business forms along one side therefor. A similarly constructed edge sealer is provided opposite the first mentioned edge sealer for sealing the multi-ply edges of forms along their opposite sides. Thus, a pair of such edge sealers constitute an edge sealing unit which may be disposed as a standalone unit as part of a conveyor system used in the manufacture of the forms.

In a preferred embodiment hereof, the heater frame includes an anvil, a heater band and a plurality of insulating rods. The rods are longitudinally spaced one from the other along an arcuate, preferably convex, surface on the anvil for supporting the heater band, preferably formed of nickel chromium, in spaced insulating relation to the anvil. The heater band is thus similarly shaped as the convex anvil surface and forms the convex surface of the heater block. The heater band is passed about hollow copper, preferably chromium-plated, supports cap at either end of the anvil and is spring-biased by a take-up spring at one end such that the band is tensioned along the rods. The endless belt is preferably formed of silicone and lies in opposition to the heater band in conformance to the convex shape of the latter. Consequently, the endless belt drives the business form through the edge sealer, particularly such that the edges pass along the track or run between the heater band and the opposed portion of the belt. The heater band is heated through suitable electrical connections to the copper support caps. By engaging the form edge with the heater band, the adhesive is activated by the heat of the heater band to seal the edges of the multi-ply form.

As indicated previously, a pair of such edge sealers may be transversely spaced one from the other on the opposite sides of the form. In this manner, the multi-ply form is transported between the edge sealers and the edges of the plies on each of the opposite sides of the form are thereby, respectively, adhesively sealed one to the other.

In another embodiment hereof, and instead of a heater band and insulating rods, the heater frame may comprise an aluminum block or anvil having a bore for receiving a cartridge-type heater. Thus, the convex surface of the anvil is heated by the heater cartridge and heat is applied directly from the anvil to the edge of the form as it passes through the edge sealer.

In those applications where it is necessary to seal four orthogonally-related edges of the business form, a second set of edge sealers hereof may be supplied downstream of the first set. Thus, a first pair of opposite parallel edges of a form are sealed by a first set of edge sealer arranged parallel to and straddling a first conveyor. A second conveyor is arranged such that the direction of the flow of the forms is changed from that of the first conveyor while the orientation of each form remains unchanged. For example, the second conveyor may advance the forms in a direction 90° relative to the direction of conveyance of the forms through the first conveyor and first set of edge sealers but without changing the orientation of the forms. With the second set of edge sealers arranged parallel to the direction of the flow of forms along the second conveyor, the unsealed edges of the forms on the second conveyor thus extend parallel to the second set of edge sealers, i.e., parallel to the direction of conveyance of the forms along the second conveyor. These unsealed parallel edges are then passed through the second set of edge sealers whereby all four edges of the multi-ply form are sealed.

It will, of course, be appreciated that only one side of a form may be sealed in either the first or second conveyor depending upon the characteristics of the forms being manufactured. Thus, a form having three edges sealed together may be provided using two edge sealers in one conveyor and only one edge sealer along the other conveyor. Additionally, the edge sealers may be disposed as stand-alone units in tandem with detachers or other form-feeding devices as desired in the manufacturing process.

It is a principal feature of the present invention that the heat is applied only in the areas of the edges of the form where the heat-sensitive adhesive is applied. This effectively precludes any softening of the toner used by cold-fuse type laser printers and therefore prevents transfer of information from one ply of the form to another ply.

In a preferred embodiment according to the present invention, there is provided apparatus for heat-sealing the edge of a multi-ply business form having heat-sensitive adhesive applied along an edge thereof comprising a frame, an endless belt carried by the frame and means for driving the belt. A guide surface is carried by the frame in opposition to a portion of the belt for receiving the edge of the multi-ply business form therebetween and means are carried by the frame for applying heat to the edge passing between the belt portion and the guide surface to activate the heat-sensitive adhesive and secure the plies one to the other.

Accordingly, it is a primary object of the present invention to provide a novel and improved edge sealer for activating heat-sensitive adhesive along the edges of a multi-ply business form without affecting the portions of the form interior of its edges.

These and further objects and advantages of the present invention will become more apparent upon reference to the following specification, appended claims and drawings.

BRIEF DESCRIPTION OF THE DRAWING FIGURES

FIG. 1 is a perspective view of an edge sealer unit constructed in accordance with the present invention; and FIG. 2 is a schematic illustration of the direction of flow of the forms and the arrangement of a pair of edge sealing units hereof to effect a seal about all four edges of the forms.

DETAILED DESCRIPTION OF THE DRAWING FIGURES

Reference will now be made in detail to the present preferred embodiment of the invention, an example of which is illustrated in the accompanying drawings.

Referring now to the drawings, particularly to FIG. 1, there is illustrated a pair of edge sealers, generally designated 10a and 10b, comprising an edge sealing unit, generally designated 12, for sealing the opposite edges of multi-ply business forms. Such forms may be of the type disclosed in U.S. Pat. Nos. 4,709,850; 4,715,530; 4,776,510 and 4,809,906, of common assignee herewith. Each edge sealer 10 comprises a frame or support structure 14 mounting a heater anvil, generally designated 16, along an inside surface thereof. Heater anvil 16 has a convex upper surface 18. In this preferred form of the present invention, a plurality of rods 20, preferably formed of Teflon ®, are longitudinally spaced along the convex upper surface 18 and extend transversely to underlie and support a heater band 22.

Heater band 22 overlies rods 20 in generally conformal relation to the upper convex surface 18 of anvil 16 whereby the portion of the heater band 22 along convex surface 18 is likewise generally convex. One end of heater band 22 is fixed about a fixed support pin 24 and extends about a hollow support cap 26, preferably formed of copper, at one end of anvil 16. A similar cap 28 is provided at the opposite end of anvil 16. The heater band 22 at that end extends about cap 28 for connection to a take-up spring 30. The opposite end of take-up spring 30 is fixed to a pin 31 carried by frame 14. Consequently, heater band 22 is tensioned over the spaced insulating rods 20 and around support caps 26 and 28. Electrical connections, not shown, are provided on support caps 26 and 28 whereby electrical energy is supplied to heater band 22 to heat the latter.

Heater anvil 16 lies in opposition to a belt portion 32 forming part of an endless belt 34. Endless belt 34 is preferably formed of a silicone compound and extends about a drive pulley 40 located adjacent support cap 26 at one end of the belt portion 32 in opposition to heater band 22. The drive pulley 40 is connected to a shaft 42 which is suitably driven, by means not shown, and also connected to edge sealer 10b. Belt 34 extends about an idler pulley 44 at the opposite end of belt portion 32 adjacent support cap 28 and around a pair of upper idler pulleys 46 and 48. It will be appreciated that the pulleys 40 and 44 are at an elevation lower than the midpoint of the convex surface of the heater band whereby the belt portion 32 extending between pulleys 40 and 44 lies generally conformal to the convex heater band 22.

It will be appreciated that the edges of a multi-ply business form may pass between belt portion 32 and heater band 22. By shaping such opposing surfaces and conforming the form edges to the arcuate configuration of the track or run between band 22 and belt portion 32, contact between the form edges and heater band 22 is ensured as the form passes longitudinally through the edge sealer 10a.

The opposite side of the heat-sealing unit 12 comprises an edge sealer 10b which is similarly constructed as previously described with respect to edge sealer 10a but in a mirror-image configuration. The two edge sealers 10a and 10b are secured one to the other in adjusted transversely spaced positions. To accomplish this, a shaft 50 extends through suitable openings in frames 14 and through bosses 52 on the outer sides of frames 14. Threaded locking knobs 54 extend into bosses 52 to lock the shaft 50 to the frames in selected transversely adjusted positions along shaft 50 thereby variably spacing the edge sealers 10a and 10b from one another.

From the foregoing description, it will be appreciated that edge sealing unit 12 may comprise a stand-alone unit disposed in a conveyor line, for example, in tandem with detachers or other feeding devices, for sealing the opposite edges of multi-ply forms. The forms flow in the direction of the arrow 58 in FIG. 1, with their opposite lateral edges disposed in the runs or tracks between the endless belts 34 and heater bands 22, respectively, of the edge sealers 10a and 10b. When the heating bands are activated, heat is applied directly to the edges of the forms between bands 22 and belt portions 32 and without application of heat to the interior of the form between edge sealers 10a and 10b. By using heat-sensitive or activated adhesive, the applied heat activates the adhesive to seal the opposed edges of the form one to the other.

In a preferred embodiment of the edge sealer, the insulating rods 20 space heater band 22 from the surface 18 of anvil 16. This thermally insulates the band 22 from anvil 16 whereby the heat generated is applied directly to the form edge and not otherwise dissipated by the anvil. An insulating tape e.g., formed of Teflon ®, may be disposed over anvil surface 18 if further heat insulation is desired. The heater band is preferably formed of nickel chromium and operating temperatures of about 300° F. in the band would be typical, although operation at a maximum temperature of about 525° F. may be achieved. The wattage applied may be about 35 watts/in$^2$. With a heater band seven inches long, approximately 250 watts of power would be applied, assuming a one-inch wide band. The anvil can be formed of any material, preferably non-thermally conductive material such as plastic or a plastic composite. The copper support caps 26 and 28 are preferably hollow and chrome-plated. Also, the relative positions of the heater block and belt may be reversed. That is, the heater anvil may be disposed above the belt. Also, by curving the heater anvil in a convex direction with the belt portion concave, the belt portion consistently presses the plies against the heater anvil to maintain constant contact and thereby facilitate heat transfer to the adhesive. The edge sealer may be operated at a speed of 200 feet per minute with two plies. Therefore, 200 feet of forms may be sealed per minute. Of course, it will be appreciated that the sealing speed is affected by the number of plies and the thickness of the paper, the greater the number and thickness thereof, the slower the speed. The forms are preferably passed individually through the edge sealing unit, the plies thereof being temporarily secured in position for final adhesive securement, for example, by mechanical crimps. Thus, the plies of the form will not separate from one another prior to sealing.

Referring now to FIG. 2, there is schematically illustrated a pair of conveyors 60 and 62. Conveyor 60 receives the form from a processing unit, for example, a printing unit 64, and conveys the form in the direction of the arrow designated 66. A pair of edge sealers 10a and 10b, constituting a first edge sealing unit 12, are located along the opposite sides of conveyor 60 for sealing the edges of the form. It will be appreciated that the edges of the forms sealed by the first unit 12 lie parallel to the direction of travel of conveyor 60. Where it is desirable that an additional edge or an additional pair of edges of the form be heat-sealed, conveyor 62 is employed to convey the partially sealed form through a second edge sealer unit 12'. To accomplish this, conveyor 62 is angularly related to conveyor 60. For example, conveyor 62 is disposed at right angles to conveyor 60 for flowing the forms in the direction of the arrow designated 68. The forms, however, when being transferred from conveyor 60 to conveyor 62 remain in their same spatial orientation and only the direction of their conveyance changes. Thus, the laterally opposite sealed edges of the forms on conveyor 60, which extended parallel to the direction of conveyance on conveyor 60, now extend transversely to the direction of conveyance of the forms on conveyor 62. Thus, the unsealed edges of the forms on conveyor 62 extend generally parallel to its direction of conveyance 68. The edge sealers 10a' and 10b' of edge sealer 12' may be disposed along the opposite sides of conveyor 62 to seal the third and fourth edges of the multi-ply forms one to the other.

It will be appreciated that the foregoing discussion applies to forms which have orthogonally related edges and that all edges are sealed. Obviously, three edges may be sealed, leaving a fourth edge unsealed if desired simply by deactivating one of the edge sealers of one of the units 12 or 12'. Also, seals along edges not orthogonally related one to the other may be effected similarly as described by angling the conveyors 60 and 62 at the appropriate angle relative to one another and parallel to the edge or portion of the form to be sealed.

In another embodiment of edge sealer hereof, the heater band 22 and the insulating rods may be omitted in favor of a heater cartridge. The cartridge may be disposed in a bore in the heating block. In this form, the heater would be comprised of only the anvil and be formed of highly thermally conductive material. Thus, the heating block is heated by the heater cartridge and the heat applied through its upper convex surface directly to the edges of the form.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for heat-sealing the edge of a multi-ply business form having heat-sensitive adhesive applied along an edge thereof comprising:
    a frame;
    an endless belt carried by said frame;
    means for driving said belt;
    a guide surface carried by said frame in opposition to a portion of said belt for receiving the edge of the multi-ply business form therebetween;
    means carried by said frame for applying heat to the edge passing between said belt portion and said guide surface to activate the heat-sensitive adhesive and secure the plies one to the other; and
    a second frame spaced opposite the first mentioned frame, a second endless belt carried by said second frame, means for driving said second belt, a second guide surface carried by said second frame in opposition to a portion of said second belt for receiving therebetween a second edge of the multi-ply business form opposite the first-mentioned edge and which second edge has heat-sensitive adhesive applied thereto, and means for applying heat to the second edge passing between said second belt portion and second guide surface to activate the heat-sensitive adhesive therealong to secure the plies of the second edge one to the other.

2. Apparatus according to claim 1 including means for adjustably spacing said first and second frames relative to one another.

3. Apparatus according to claim 2 wherein said adjustable spacing means includes means for releasably locking said frames in adjusted spaced positions relative to one another.

4. Apparatus according to claim 1 in combination with a first conveyor for transporting in one direction forms to be sealed through the sealing apparatus carried by said said first and second frames, a second conveyor for conveying the forms in an angularly related direction relative to said one direction, a third frame adjacent said conveyor for sealing a third edge of the multi-ply form having a heat-sensitive adhesive applied therealong, a third endless belt carried by said third frame, means for driving said third belt, a third guide surface in opposition to a portion of said third belt for receiving therebetween the third edge of the multi-ply business form and means for applying heat to the third form edge passing between said third belt portion and said third guide surface to activate the heat-sensitive adhesive therealong to secure the plies of the third edge one to the other.

5. Apparatus according to claim 4 including a fourth frame spaced opposite said third frame, a fourth endless belt carried by said fourth frame, means for driving said fourth belt, a fourth guide surface carried by said fourth frame in opposition to a portion of said fourth belt for receiving therebetween a fourth edge of the multi-ply business form opposite the third edge and which fourth edge has heat-sensitive adhesive applied thereto and means for applying heat to the fourth edge passing between said fourth belt portion and said fourth guide surface to secure the plies of the fourth edge one to the other.

6. Apparatus for heat-sealing solely at least one of the edges of a multi-ply business form having heat-sensitive adhesive applied along said one edge thereof comprising:
- a frame;
- an endless belt carried by said frame for continuously advancing the multi-ply form along said frame;
- means for driving said belt;
- an elongated guide surface carried by said frame in opposition to an elongated portion of said belt, said guide surface and said belt portion having a width sufficient only to receive and engage solely the one edge of the multi-ply business form therebetween; and
- said guide surface including an elongated electrically actuated heater band carried by said frame in opposition to said elongated belt portion and substantially coextensive therewith for continuously and uninterruptedly applying heat to the one edge advancing between said elongated belt portion and said elongated guide surface and throughout the length of said belt portion in opposition to said guide surface to activate the heat-sensitive adhesive and secure the plies one to the other.

7. Apparatus according to claim 6 wherein said guide surface is convex in a direction toward the belt portion.

8. Apparatus according to claim 6 wherein said heater band is formed of nickel chromium.

9. Apparatus according to claim 6 wherein said guide surface includes an anvil and means for tensioning said heater band about said anvil.

10. Apparatus according to claim 9 including a plurality of insulating rods spaced one from the other along said anvil and spacing said heater band from said anvil to thermally insulate the anvil from said band.

11. Apparatus according to claim 6 wherein said belt is formed of silicone.

12. Apparatus according to claim 6 in combination with a business form having a pair of plies having respective edges in registration one with the other and adhesive therebetween, said registering edges being disposed between said heater band and said elongated belt portion for continuous advancement through said apparatus whereby the edges of the respective registering edges of the business form are secured one to the other.

* * * * *